US012020665B2

(12) United States Patent
Shigeta

(10) Patent No.: US 12,020,665 B2
(45) Date of Patent: Jun. 25, 2024

(54) SOURCE DRIVER AND DISPLAY DEVICE

(71) Applicant: LAPIS Technology Co., Ltd., Yokohama (JP)

(72) Inventor: Kenichi Shigeta, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/187,671

(22) Filed: Mar. 22, 2023

(65) Prior Publication Data

US 2023/0317029 A1 Oct. 5, 2023

(30) Foreign Application Priority Data

Mar. 30, 2022 (JP) ................................ 2022-055090

(51) Int. Cl.
*G09G 3/36* (2006.01)

(52) U.S. Cl.
CPC ... *G09G 3/3696* (2013.01); *G09G 2320/0233* (2013.01)

(58) Field of Classification Search
CPC ..... G09G 2310/027; G09G 2320/0204; G09G 2320/0233; G09G 2320/0276
See application file for complete search history.

(56) References Cited

U.S. PATENT DOCUMENTS 3,934,136 A * 1/1976 Schoon .................. H04N 1/403 250/214 R
2003/0201734 A1* 10/2003 Krieger .............. H05B 41/2853 315/360
2008/0033229 A1* 2/2008 Park ..................... A61N 1/3603 600/28
2022/0028349 A1* 1/2022 Shigeta ................ G09G 3/3685
2022/0199050 A1* 6/2022 Shigeta ................ G09G 3/3648

FOREIGN PATENT DOCUMENTS

JP 2009015166 1/2009
JP 2016099555 5/2016

OTHER PUBLICATIONS

KR102414370B1 Gamma Voltage Generater and Display Device Using the Same Jun. 29, 2022 (Year: 2022).*

* cited by examiner

*Primary Examiner* — Van N Chow
(74) *Attorney, Agent, or Firm* — JCIPRNET

(57) ABSTRACT

A first ladder resistor circuit including multiple first resistors connected to each other in series between a first connection point to which a first reference voltage is supplied and a second connection point to which a second reference voltage is supplied, and outputting multiple first divided voltages as the first reference voltages of multiple reference voltages; and a second ladder resistor circuit including multiple second resistors connected to each other in series in at least one of an area between the first connection point and a power supply terminal to which a power supply voltage higher than the first reference voltage is supplied and an area between the second connection point and a grounding terminal to which a ground potential lower than the second reference voltage is supplied, and outputting at least one second divided voltage as the second reference voltage of the plurality of reference voltages are provided.

7 Claims, 6 Drawing Sheets

SOURCE DRIVER AND DISPLAY DEVICE

CROSS-REFERENCE TO RELATED APPLICATION

This application claims priority under 35 USC 119 from Japanese Patent application No. 2022-055090 filed on Mar. 30, 2022, the disclosure of which is incorporated by reference herein.

BACKGROUND

Technical Field

The disclosure relates to a source driver applying a drive voltage to a source line of a display panel, and a display device having the source driver.

Description of Related Art

For example, in a liquid crystal-type display panel, a plurality of gate lines extending in a horizontal direction in a two-dimensional screen, a plurality of source lines extending in a vertical direction in the two-dimensional screen, a source driver applying a drive voltage corresponding to a video signal to each of the source lines, a reference voltage source supplying a reference voltage to the source driver, and a gate driver applying a gate voltage to each of the gate lines are disposed.

As disclosed in Japanese Patent Laid-Open No. 2009-15166 and Japanese Patent Laid-Open No. 2016-99555, a source driver includes a DA conversion circuit that converts a digital video signal into a drive voltage having an analog voltage value, and a gradation voltage generation circuit that generates a plurality of (for example, 64) gradation voltages corresponding to the entire luminance range able to be indicated by a video signal and respectively having different voltage values. The gradation voltage generation circuit is constituted to generate a plurality of gradation voltages by dividing a reference voltage generated by a reference voltage source disposed in a display panel using a ladder resistor circuit. In the DA conversion circuit, a gradation voltage corresponding to a luminance level indicated by a video signal is selected from a plurality of gradation voltages generated by the gradation voltage generation circuit, and this is output as a drive voltage.

Incidentally, in particularly large-sized display panels, source drivers are constructed of a plurality of divided semiconductor IC chips. Generally, a plurality of semiconductor IC chips constituting source drivers is arrayed along a panel main body on a substrate of a display panel. In each of the plurality of semiconductor IC chips, a plurality of output terminals of the semiconductor IC chips and as many source lines as the number of the plurality of output terminals in all of the source lines are respectively connected to each other. A reference voltage source is connected to each of the plurality of semiconductor IC chips via connection lines on the substrate. That is, one reference voltage source is constituted to supply a reference voltage to the plurality of semiconductor IC chips.

However, since lengths of the connection lines connecting the plurality of semiconductor IC chips constituting the source drivers and the reference voltage source to each other vary depending on each of the plurality of semiconductor IC chips, the level of the reference voltage received by each of the plurality of semiconductor IC chips slightly varies due to the difference in wiring resistance value of each of the connection lines. As a result, a gradation voltage with respect to the same luminance level in each of the semiconductor IC chips, that is, the level of a drive voltage varies, and this may cause a problem of luminance unevenness appearing in image display.

SUMMARY

The disclosure provides a source driver and a display device capable of curbing luminance unevenness caused by a difference in lengths of connection lines from a reference voltage source.

According to the disclosure, a source driver includes a gradation voltage generation circuit generating a plurality of gradation voltages corresponding to respective luminance levels of a luminance range able to be indicated by a video signal based on a plurality of reference voltages having different voltage levels, selects a gradation voltage corresponding to a luminance level indicated by the video signal from the plurality of gradation voltages, and sends out a drive signal having the gradation voltage that is selected to a display panel. The gradation voltage generation circuit has a first input part supplying a first reference voltage at a highest level in the plurality of reference voltages to a first connection point; a second input part supplying a second reference voltage at a lowest level in the plurality of reference voltages to a second connection point; a first ladder resistor circuit including a plurality of first resistors connected to each other in series between the first connection point and the second connection point, generating a plurality of first divided voltages by dividing a voltage difference between the first reference voltage and the second reference voltage using the plurality of first resistors, and outputting the plurality of first divided voltages as the first reference voltages of the plurality of reference voltages; and a second ladder resistor circuit including a plurality of second resistors connected to each other in series in at least one of an area between the first connection point and a power supply terminal to which a power supply voltage higher than the first reference voltage is supplied and an area between the second connection point and a grounding terminal to which a ground potential lower than the second reference voltage is supplied, generating at least one second divided voltage by dividing an applied voltage between the plurality of second resistors using the plurality of second resistors, and outputting the at least one second divided voltage as the second reference voltage of the plurality of reference voltages.

According to the disclosure, a display device has a display panel and a source driver that includes a gradation voltage generation circuit generating a plurality of gradation voltages corresponding to respective luminance levels of a luminance range able to be indicated by a video signal based on a plurality of reference voltages having different voltage levels, selects a gradation voltage corresponding to a luminance level indicated by the video signal from the plurality of gradation voltages, and sends out a drive signal having the gradation voltage that is selected to the display panel. The gradation voltage generation circuit has a first input part supplying a first reference voltage at a highest level in the plurality of reference voltages to a first connection point; a second input part supplying a second reference voltage at a lowest level in the plurality of reference voltages to a second connection point; a first ladder resistor circuit including a plurality of first resistors connected to each other in series between the first connection point and the second connection point, generating a plurality of first divided voltages by dividing a voltage difference between the first reference voltage and the second reference voltage u sing the plurality of first resistors, and outputting the plurality of first divided voltages as the first reference voltages of the plurality of reference voltages; and a second ladder resistor circuit including a plurality of second resistors connected to each other in series in at least one of an area between the first connection point and a power supply terminal to which a power supply voltage higher than the first reference voltage is supplied and an area between the second connection point and a grounding terminal to which a ground potential lower than the second reference voltage is supplied, generating at least one second divided voltage by dividing an applied voltage between the plurality of second resistors using the plurality of second resistors, and outputting the at least one second divided voltage as the second reference voltage of the plurality of reference voltages.

According to the source driver and the display device of the disclosure, since a reference voltage out of a range of a plurality of reference voltages generated by the first ladder resistor circuit can be extended and generated by the second ladder resistor circuit, even if there is a difference between lengths of connection lines connecting a reference voltage source to source drivers, a plurality of gradation voltages which are the same can be generated in the source drivers. Accordingly, luminance unevenness can be curbed.

Figure 4:
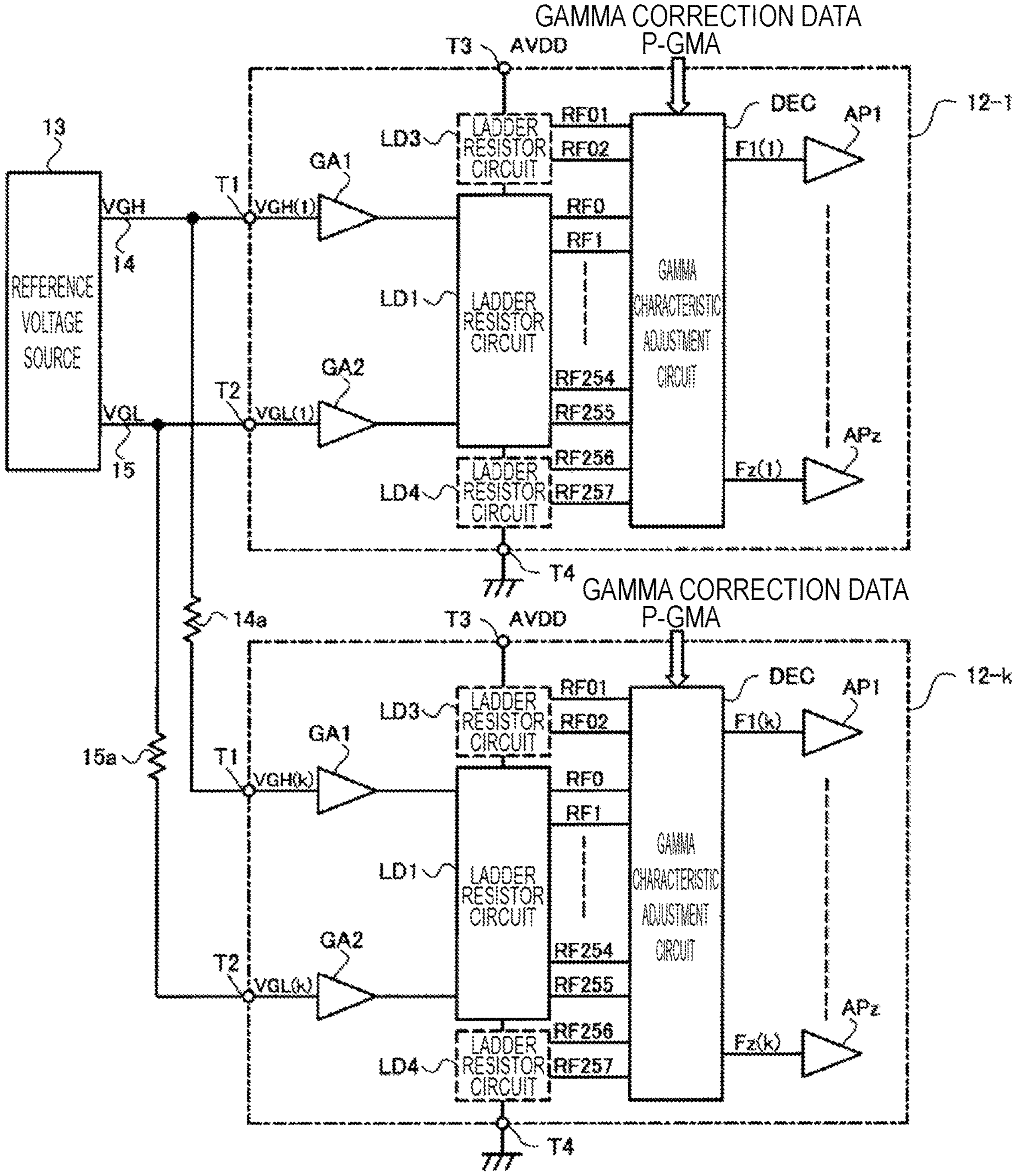
FIG. 4 is an explanatory view of operation of the gradation voltage generation circuit when wiring resistors are present in connection lines between the source drivers and a reference voltage source.
Figure 5:
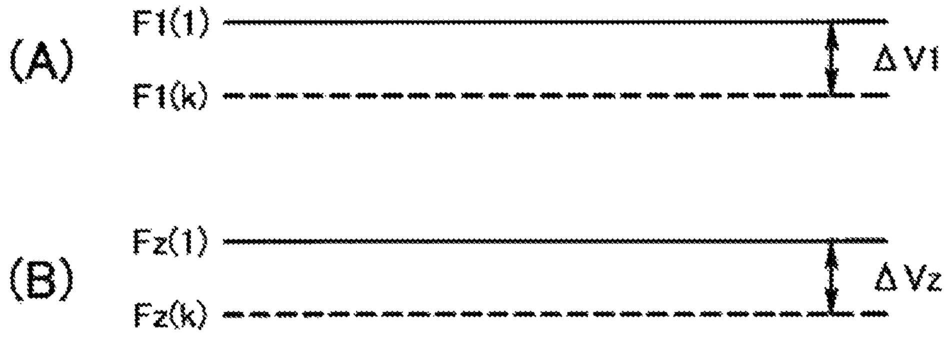

(A) and (B) of FIG. 5 are views showing reduction in reference voltage caused by the wiring resistors in FIG. 4.

Figure 6:
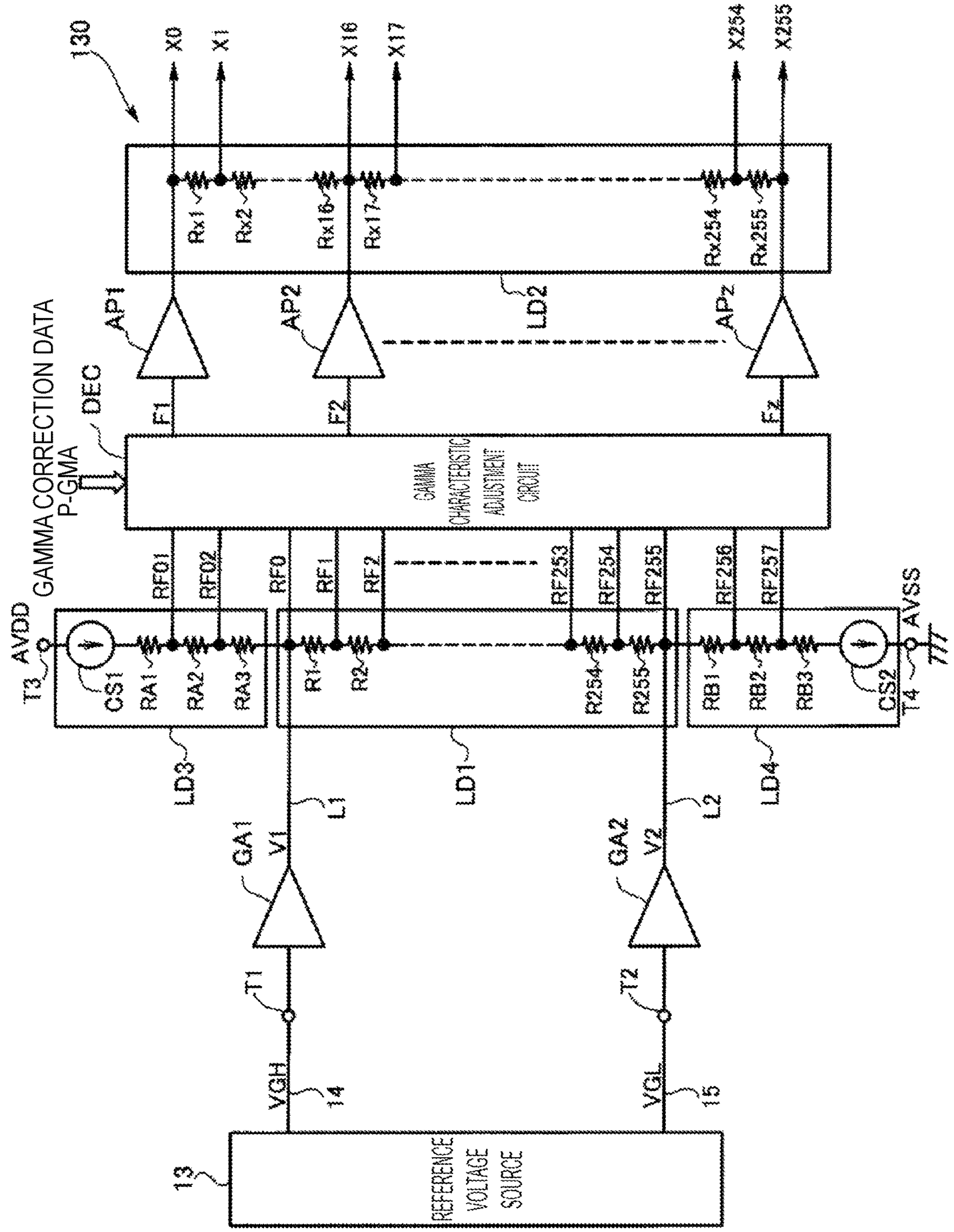

FIG. 6 is a circuit diagram showing an internal constitution of the gradation voltage generation circuit of the source drivers according to Example 2 of the disclosure.

DESCRIPTION OF THE EMBODIMENTS

Hereinafter, Examples of the disclosure will be described in detail with reference to the drawings.

EXAMPLE 1

Figure 1:
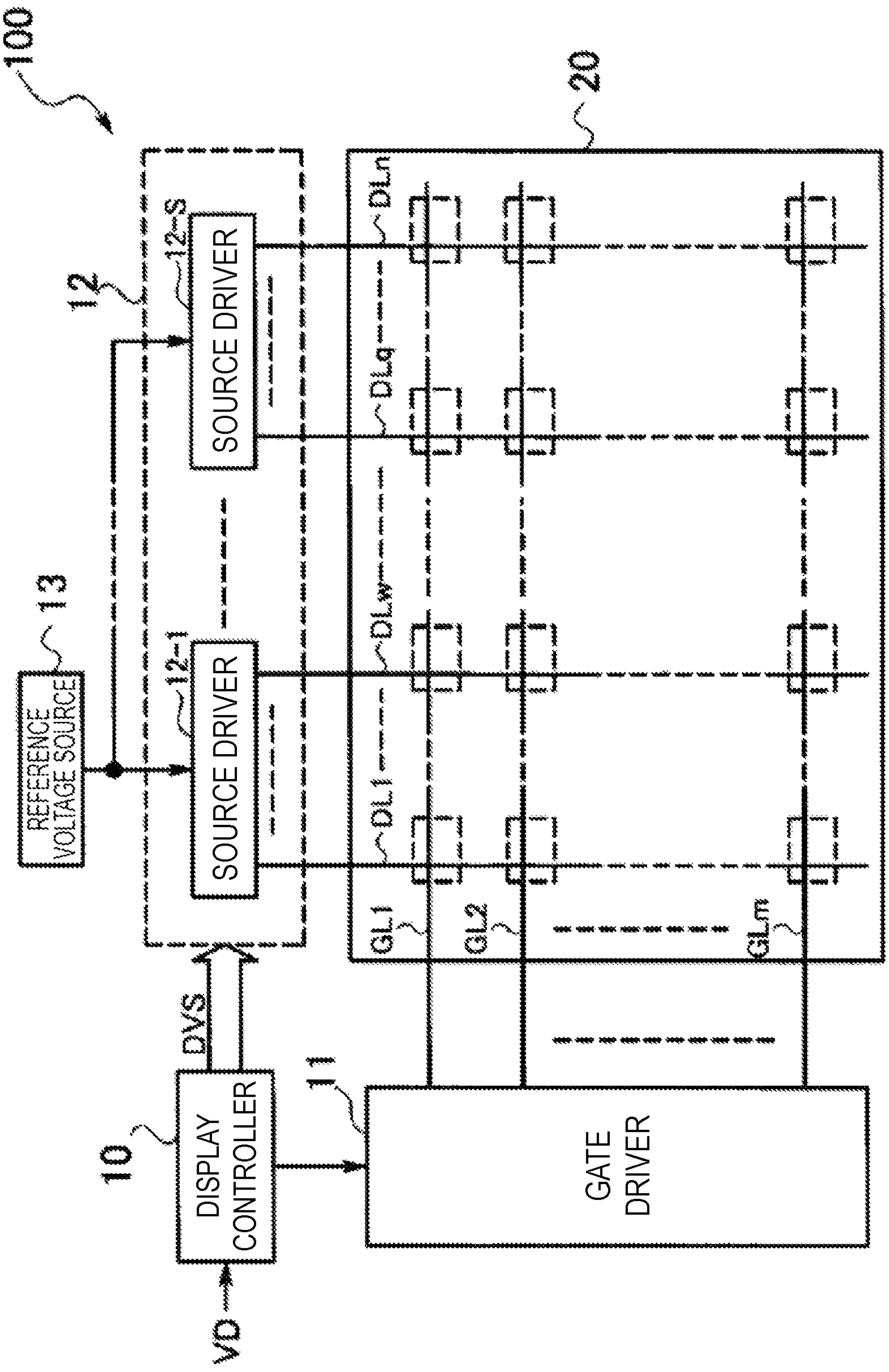
FIG. 1 is a block diagram showing a schematic constitution of a display device including source drivers according to Example 1 of the disclosure.

FIG. 1 is a block diagram showing a schematic constitution of a display device in which source drivers according to Example 1 of the disclosure are mounted.

As illustrated in FIG. 1, a display device 100 has a display controller 10, a gate driver 11, a source driver 12, a reference voltage source 13, and a display panel 20. The gate driver 11, the source driver 12, and the reference voltage source 13 are disposed on a substrate (not illustrated) of the display panel 20.

The display panel 20 is constituted of a liquid crystal display panel, for example, and has m (m is a natural number equal to or larger than 2) gate lines GL1 to GLm extending in a horizontal direction in a two-dimensional screen and n (n is an even number equal to or larger than 2) source lines DL1 to DLn extending in a vertical direction in the two-dimensional screen. Display cells (regions surrounded by dotted lines) displaying red, green, or blue are formed in respective intersection parts between the gate lines GL1 to GLm and the source lines DL1 to DLn.

The display controller 10 receives a video signal VD and supplies a gate timing signal, which indicates a timing of applying a gate selection signal to each of the gate lines GL1 to GLr, to the gate driver 11 based on the video signal VD.

In addition, the display controller 10 generates a series of display data PD indicating various control signals including clock signals, polarity reversal signals, synchronization signals, and the like, and luminance levels of respective pixels in digital values based on the video signal VD. The display controller 10 supplies these control signals and digital video signals DVS including the series of display data PD to the source driver 12.

The gate driver 11 sequentially generates gate selection signals including at least one pulse for selecting gate lines in accordance with gate timing signals supplied from the display controller 10 and supplies the generated gate selection signals to each of the gate lines GL1 to GLm of the display panel 20.

The source driver 12 acquires the series of display data PD included in the video signals DVS by an amount corresponding to one horizontal scanning line (n pieces) and converts each piece of the display data PD into a pixel drive signal having an analog voltage value corresponding to the luminance level. Further, the source driver 12 individually supplies the n generated pixel drive signals to the source lines DL1 to DLn of the display panel 20.

The source driver 12 is constituted of S source drivers 12-1 to 12-S respectively included in S (S is an integer equal to or larger than 2) semiconductor IC chips each of which is independent.

The source drivers 12-1 to 12-S are provided correspondingly to each source line group of the classified source line groups constituted of w (w is an integer equal to or larger than 2) source lines adjacent to each other from the source lines DL1 to DLn of the display panel 20 and have internal constitutions which are the same as each other. For example, the source driver 12-1 supplies respective corresponding pixel drive signals to w source lines DL1 to DLw of the source lines DL1 to DLn. In addition, the source driver 12-S supplies respective corresponding pixel drive signals to w source lines DLq (q is an integer equal to or larger than 2) to DLn of the source lines DL1 to DLn.

Figure 3:
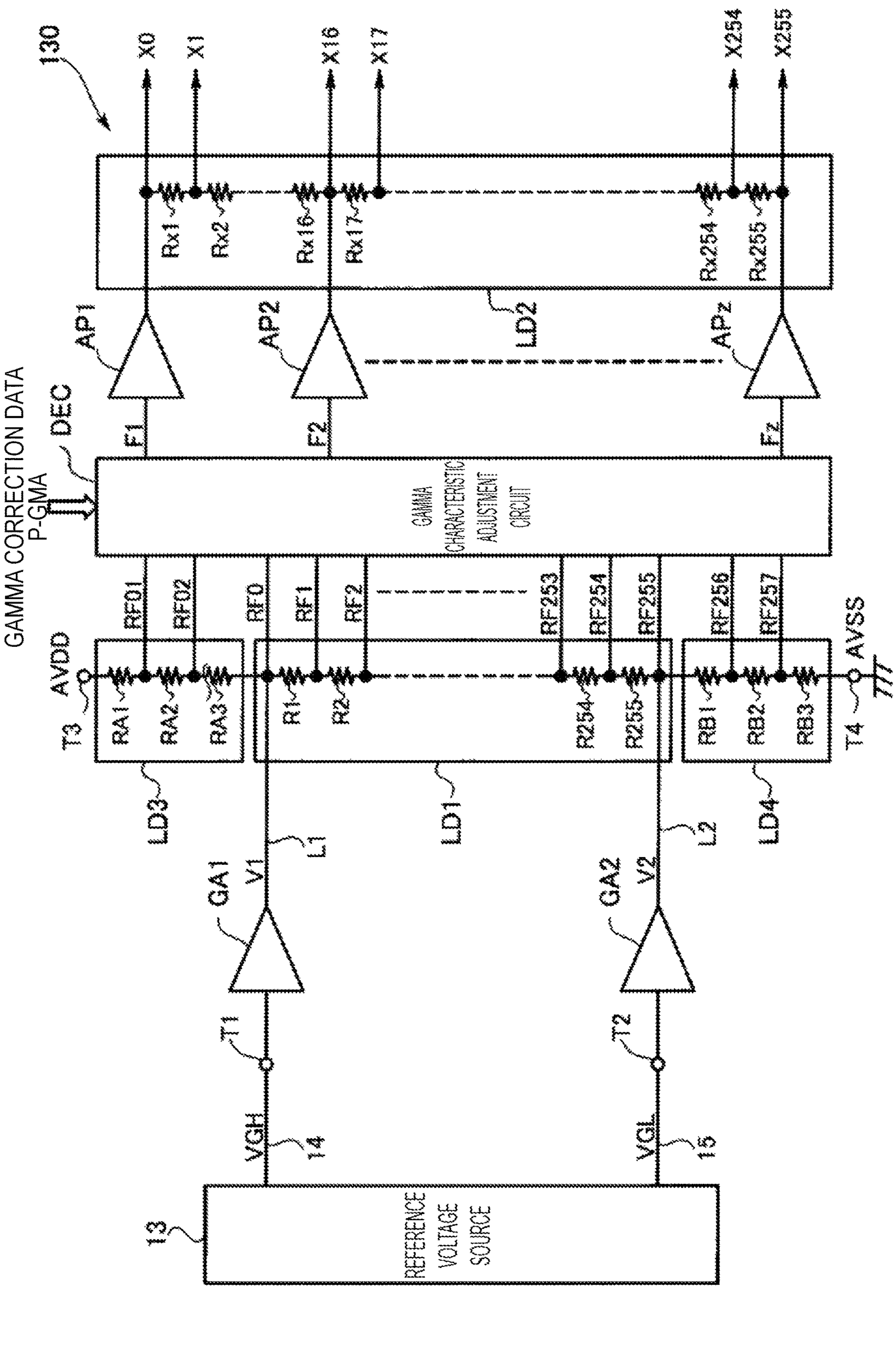
FIG. 3 is a circuit diagram showing an internal constitution of a gradation voltage generation circuit.

The reference voltage source 13 generates two reference voltages VGH and VGL. The magnitude relationship between voltage levels of VGH and VGL is VGH>VGL. The reference voltage source 13 is connected to each of the source drivers 12-1 to 12-S via the connection lines 14 and 15 as illustrated in FIG. 3. The reference voltages VGH and VGL are supplied to each of the source drivers 12-1 to 12-S via the connection lines 14 and 15.

Figure 2:
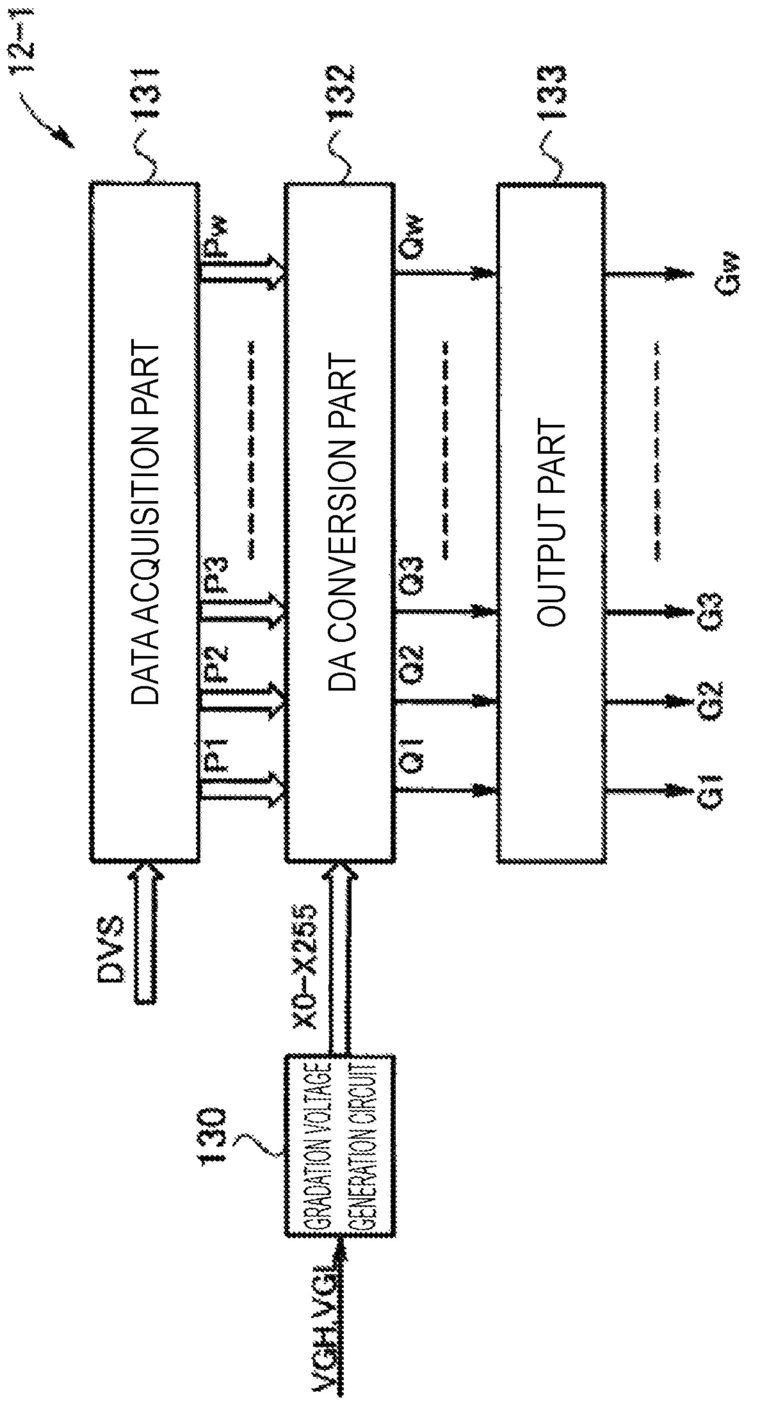
FIG. 2 is a block diagram showing an internal constitution of the source driver.

FIG. 2 is a block diagram schematically showing an internal constitution of the source driver 12-1 extracted from the source drivers 12-1 to 12-S.

As illustrated in FIG. 2, the source driver 12-1 has a gradation voltage generation circuit 130, a data acquisition part 131, a DA conversion part 132, and an output part 133.

The gradation voltage generation circuit 130 is connected to the reference voltage source 13 via the connection lines 14 and 15. The gradation voltage generation circuit 130 generates gradation voltages X0 to X255 which indicate voltage values different from each other and indicate a range of the luminance levels able to be expressed in 256 stages, for example, by video signals based on the reference voltages VGH and VGL output from the reference voltage source 13 and supplies the generated gradation voltages to the DA conversion part 132.

The data acquisition part 131 sequentially acquires w pieces of display data PD corresponding to the source lines DL1 to DLw from the series of display data PD included in the video signals DVS for each one of horizontal scanning periods and respectively supplies the acquired pieces of the display data PD to the DA conversion part 132 as display data P1 to the display data Pw.

The DA conversion part 132 converts the display data P1 to the display data Pw into gradation voltage signals Q1 to Qw having an analog voltage value using the gradation voltages X0 to X255. That is, the DA conversion part 132 selects a gradation voltage having a voltage value corresponding to a luminance level indicated by the display data P thereof from the gradation voltages X0 to X255 for each piece of the display data P1 to the display data Pw. Further, the DA conversion part 132 obtains the gradation voltage signals Q1 to Qw each having a gradation voltage selected for each piece of the display data P1 to the display data Pw. The DA conversion part 132 supplies the gradation voltage signals Q1 to Qw to the output part 133.

The output part 133 outputs signals obtained by individually amplifying the gradation voltage signals Q1 to Qw as pixel drive signals G1 to Gw. That is, the output part 133 of the source driver 12-1 outputs the pixel drive signals G1 to Gw and respectively supplies the output pixel drive signals to the source lines DL1 to DLw of the display panel 20.

FIG. 3 is a circuit diagram showing an internal constitution of the gradation voltage generation circuit 130 of the source driver 12-1.

As illustrated in FIG. 3, the gradation voltage generation circuit 130 includes amplifiers GA1 and GA2 serving as input gamma buffer amplifiers; ladder resistor circuits LD1, LD2, LD3, and LD4; a gamma characteristic adjustment circuit DEC; and amplifiers AP1 to APz serving as output gamma buffer amplifiers. The connection lines 14 and 15 are respectively connected to the terminals T1 and T2 of the source driver 12-1.

In FIG. 3, each of the amplifiers GA1, GA2, and AP1 to APz is an operational amplifier of a voltage follower in which an inverted input terminal and an output terminal of itself are connected to each other, for example.

The amplifier GA1 receives the reference voltage VGH received through the terminal T1 (first input terminal) of the source driver 12-1 through a non-inverted input terminal of itself, outputs a potential obtained by amplifying the reference voltage VGH as a first potential V1 through the output terminal of itself, and applies this to a line L1. Since the amplifier GA1 is an operational amplifier of a voltage follower, the first potential V1 is equivalent to the reference voltage VGH.

The amplifier GA2 receives the reference voltage VGL received through the terminal T2 (second input terminal) of the source driver 12-1 through a non-inverted input terminal of itself, outputs a potential obtained by amplifying the reference voltage VGL as a second potential V2 through the output terminal of itself, and applies this to a line L2. Since the amplifier GA2 is an operational amplifier of a voltage follower, the second potential V2 is equivalent to the reference voltage VGL.

The ladder resistor circuit LD1 is a first ladder resistor circuit including resistors R1 to R255 (plurality of first resistors) connected to each other in series. One end of the resistor R1 that is one end (first connection point) of the ladder resistor circuit LD1 is connected to the line L1, and one end of the resistor R255 that is the other end (second connection point) of the ladder resistor circuit LD1 is connected to the line L2.

According to such a constitution, the ladder resistor circuit LD1 divides a voltage between the lines L1 and L2, outputs 256 voltages having voltage values different from each other as reference voltages RF0 to RF255 from the connection points between the resistors R1 to R255 including one ends of the resistors R1 and R255, and supplies each of the output voltages to the gamma characteristic adjustment circuit DEC.

The ladder resistor circuits LD3 and LD4 are second ladder resistor circuits (for error compensation) of the reference voltages VGH and VGL. The ladder resistor circuit LD3 includes resistors RA1 to RA3 (plurality of second resistors) connected to each other in series. One end of the resistor RA1 that is one end of the ladder resistor circuit LD3 is connected to a power supply terminal T3 of a power supply voltage AVDD. The level of the power supply voltage AVDD is higher than that of the reference voltage VGH. One end of the resistor RA3 that is the other end of the ladder resistor circuit LD3 is connected to the line L1, that is, one end of the ladder resistor circuit LD1. The ladder resistor circuit LD3 divides a voltage between the power supply terminal T3 and the line L1, outputs two voltages having voltage values different from each other as reference voltages RF01 and RF02 from the connection points between the resistors RA1 to RA3, and supplies each of the output voltages to the gamma characteristic adjustment circuit DEC.

The ladder resistor circuit LD4 includes resistors RB1 to RB3 (plurality of second resistors) connected to each other in series. One end of the resistor RB1 that is one end of the ladder resistor circuit LD4 is connected to the line L2, that is, the other end of the ladder resistor circuit LD1. One end of the resistor RB3 that is the other end of the ladder resistor circuit LD3 is connected to a grounding terminal T4 such that a ground potential AVSS is applied thereto. The level of the ground potential AVSS is lower than the reference voltage VGL. The ladder resistor circuit LD4 divides a voltage between the line L2 and the grounding terminal T4, outputs two voltages having voltage values different from each other as reference voltages RF256 and RF257 from the connection points between the resistors RB1 to RB3, and supplies each of the output voltages to the gamma characteristic adjustment circuit DEC.

In Example 1, there are three resistors in each of the ladder resistor circuits LD3 and LD4, but the disclosure is not limited to this number of resistors. Accordingly, the number of reference voltages generated in each of the ladder resistor circuits LD3 and LD4 is not limited to two either. In addition, resistor values of the resistors RA1 to RA3 of the ladder resistor circuit LD3 and the resistors RB1 to RB3 of the ladder resistor circuit LD4 may not be the same as each other. Moreover, the resistor values of the resistors R1 to R255 of the ladder resistor circuit LD1 may be different from each other.

The gamma characteristic adjustment circuit DEC selects z (predetermined number) reference voltages having voltage values different from each other according to gamma correction characteristics indicated by gamma correction data P-GMA from the reference voltages RF01, RF02, and RF0 to RF257. The gamma correction characteristics vary depending on each of RGB (red, green, and blue) and also vary depending on the lengths of the connection lines 14 and 15 from the reference voltage source. The factor z is a positive integer equal to or larger than 2 (for example, 10). Further, a gamma characteristic adjustment circuit SX individually supplies the z selected reference voltages to the non-inverted input terminals of the amplifiers AP1 to APz as gamma reference voltages F1 to Fz.

The amplifiers AP1 to APz outputs potentials obtained by individually amplifying the gamma reference voltages (F1 to Fz) respectively received through the non-inverted input terminals through the output terminals of themselves. Since the amplifiers AP1 to APz are operational amplifiers of voltage followers, output potentials through the output terminals of themselves are respectively equivalent to the gamma reference voltages (F1 to Fz).

The ladder resistor circuit LD2 is a third ladder resistor circuit and has resistors Rx1 to Rx255 (plurality of third resistors) in which 256 resistors including the resistor Rx1 connected to the output terminal of the amplifier AP1 and the resistor Rx255 connected to the output terminal of the amplifier APz are connected to each other in series.

When z is 10, in the resistors Rx1 to Rx255, the output terminals of the amplifiers AP2 to APz-1 are connected to eight connection points of all connection points between the resistors connected to each other. For example, as illustrated in FIG. 3, the output terminal of the amplifier AP2 is connected to the connection point between the resistor Rx16 and the resistor Rx17. In this case, the output terminal of the amplifier APz-1 is connected to the connection point between a resistor Rx240 and a resistor Rx241.

The ladder resistor circuit LD2 divides the voltage between the potential of the output terminal of the amplifier AP1 and the potential of the output terminal of the amplifier APz and thereby outputs 256 voltages having voltage values different from each other as the gradation voltages X0 to X255 from one ends of the respective resistors Rx1 to Rx255.

Namely, the gradation voltages X0 to X255 indicating the 256 gradation luminance levels according to desired gamma correction characteristics are output to the DA conversion part 132 by the amplifiers AP1 to APz and the ladder resistor circuit LD2.

As described above, in the gradation voltage generation circuit 130 illustrated in FIG. 3, first, the ladder resistor circuit LD1 divides the voltage between the two reference voltages VGH and VGL supplied from the reference voltage source 13 and thereby generates the reference voltages RF0 to RF255. The ladder resistor circuit LD3 divides the voltage between the power supply voltage AVDD and the first potential V1 based on the reference voltage VGH and thereby generates the reference voltages RF01 and RF02. The voltage difference between the power supply voltage AVDD and the reference voltage VGH is 0.2 V, for example. In addition, the ladder resistor circuit LD4 divides the voltage between the second potential V2 based on the reference voltage VGL and the ground potential AVSS and thereby generates the reference voltages RF256 and RF257. The voltage difference between the reference voltage VGL and the ground potential AVSS is 0.2 V, for example.

Next, the gamma characteristic adjustment circuit DEC selects z voltages which become representative according to the desired gamma correction characteristics from the reference voltages RF01, RF02, and RF0 to RF257 as the gamma reference voltages F1 to Fz.

Further, the ladder resistor circuit LD2 receives the gamma reference voltages F2 to Fz-1 as intermediate potentials, divides the voltage between the gamma reference voltages F1 and Fz, and thereby generates the gradation voltages X0 to X255 indicating the 256 gradation luminance levels.

FIG. 4 illustrates the source driver 12-1 and the source driver 12-*k* (k is 2≤k≤S) which do not have the ladder resistor circuits LD3 and LD4 in the gamma characteristic adjustment circuit DEC described above. Here, it is assumed that the ladder resistor circuits LD3 and LD4 indicated by dotted lines in FIG. 4 are not present. The source driver 12-*k* is one of the source drivers 12-2 to 12-S. Each of the reference voltages VGH and VGL output from the reference voltage source 13 is supplied to the source driver 12-1 and the source driver 12-*k* via the connection lines 14 and 15. The wiring distance of the connection lines 14 and 15 between the reference voltage source 13 and the source driver 12-1 is shorter than that between the reference voltage source 13 and the source driver 12-*k*, and it is the shortest distance, for example. As illustrated in FIG. 4, compared to those between the reference voltage source 13 and the source driver 12-1, wiring resistors 14*a* and 15*a* are present in the connection lines 14 and 15 between the reference voltage source 13 and the source driver 12-*k*.

The levels (values) of the reference voltages VGH and VGL in the terminals T1 and T2 of the source driver 12-1 will be respectively referred to as VGH(1) and VGL(1), and the levels of the reference voltages VGH and VGL in the terminals T1 and T2 of the source driver 12-*k* will be respectively referred to as VGH(k) and VGL(k). Due to the presence of the wiring resistors 14*a* and 15*a*, the respective levels VGH(k) and VGL(k) of the reference voltages VGH and VGL in the terminals T1 and T2 of the source driver 12-*k* become lower than the respective levels VGH(1) and VGL(1) of the reference voltages VGH and VGL in the terminals T1 and T2 of the source driver 12-1. The reference voltages RF0 to RF255 are generated in the ladder resistor circuit LD1 inside the gradation voltage generation circuit 130 of the source driver 12-*k* based on the reference voltage levels VGH(k) and VGL(k) which have been leveled down in this manner.

In order to obtain the same gamma correction characteristics in the gamma characteristic adjustment circuit DEC of each of the source drivers 12-1 and 12-*k*, it is assumed that the gamma characteristic adjustment circuit DEC has selected z gamma reference voltages F1(1) to Fz(1) and F1(*k*) to Fz(k) by selecting the same reference voltages from the reference voltages RF0 to RF255 output from only the ladder resistor circuit LD1. In selection of such gamma reference voltages, for example, when the gamma reference voltage F1(1) and the gamma reference voltage F1(*k*) are compared with each other, a voltage difference ΔV1 is generated as illustrated in (A) of FIG. 5. In addition, when the gamma reference voltage Fz(1) and the gamma reference voltage Fz(k) are compared with each other, a voltage difference ΔVz is generated as illustrated in (B) of FIG. 5.

On the other hand, with a constitution in which the ladder resistor circuits LD3 and LD4 indicated by dotted lines in FIG. 4 are provided and the reference voltages RF01, RF02, and RF0 to RF257 are supplied from the ladder resistor circuits LD1, LD3, and LD4 to the gamma characteristic adjustment circuit DEC, in the gamma characteristic adjustment circuit DEC of the source driver 12-*k*, compensation is performed such that the gamma reference voltages F1(*k*) to Fz(k) respectively become equivalent to the gamma reference voltages F1(1) to Fz(1). That is, compensation is performed such that the voltage differences ΔV1 and ΔVk described above are not generated. Specifically, when the gamma characteristic adjustment circuit DEC of the source driver 12-1 selects the z gamma reference voltages F1(1) to Fz(1) from the reference voltages RF0 to RF255, the gamma characteristic adjustment circuit DEC of the source driver 12-*k* selects the same z gamma reference voltages F1(*k*) to Fz(k) from the reference voltages RF01, RF02, and RF0 to RF257 in accordance with the gamma correction data. In the gamma characteristic adjustment circuit DEC of the source driver 12-*k*, in addition to the reference voltages RF0 to RF255 obtained from the ladder resistor circuit LD1, the reference voltages RF01 and RF02 obtained from the ladder resistor circuit LD3 and the reference voltages RF256 and RF257 obtained from the ladder resistor circuit LD4 are used as selection targets. Accordingly, the selected gamma reference voltages F1(*k*) to Fz(k) respectively become equivalent to the gamma reference voltages F1(1) to Fz(1).

In this manner, according to the source driver of Example 1 of the disclosure, in the gradation voltage generation circuit 130, the reference voltages RF0 to RF255 output from the ladder resistor circuit LD1 can be obtained, and the reference voltages RF0 to RF255 thereof can be individually obtained by extending them from the ladder resistor circuit LD3 to the reference voltages RF01 and RF02 higher than the reference voltages RF0 and from the ladder resistor circuit LD4 to the reference voltages RF256 and RF257 lower than the reference voltages RF255. Therefore, even if there is a difference between the levels of the reference voltages VGH and VGL due to the difference in lengths of the connection lines 14 and 15 from the reference voltage source 13 to the source drivers 12-2 to 12-S, z appropriate gamma reference voltages F1 to Fz can be selected, and the gradation voltages X0 to X255 indicating the 256 gradation luminance levels can be generated in the same manner in the source drivers 12-2 to 12-S from the gamma reference voltages F1 to Fz. Thus, since the gradation voltage having a voltage value corresponding to the luminance level indicated by the display data PD is selected and output as a drive voltage from the gradation voltages X0 to X255 generated in such a manner, luminance unevenness caused by a difference in lengths of the connection lines 14 and 15 can be curbed. In addition, since the reference voltages RF01, RF02, RF256, and RF257 are obtained by the ladder resistor circuits LD3 and LD4, there is also an effect that a relatively simple constitution is sufficient without significantly changing the scale of the circuits inside the source drivers 12-2 to 12-S.

EXAMPLE 2

FIG. 6 is a circuit diagram showing an internal constitution of the gradation voltage generation circuit 130 of the source driver according to Example 2 of the disclosure. In this gradation voltage generation circuit 130, constant current sources CS1 and CS2 are provided in the ladder resistor circuits LD3 and LD4. Specifically, in the ladder resistor circuit LD3, the constant current source CS1 is connected to a part between the terminal T3 and one end of the resistor RA1. In the ladder resistor circuit LD4, a constant current source CS2 is connected to a part between the resistor RB3 and the terminal T4. The constitution of Example 2 is otherwise the same as that of Example 1.

By providing the constant current sources CS1 and CS2, a current flowing in the resistors RA1 to RA3 is limited by the constant current source CS1 in the ladder resistor circuit LD3, and a current flowing in the resistors RB1 to RB3 is limited by the constant current source CS2 in the ladder resistor circuit LD4. It is possible to stably obtain the reference voltages RF01 and RF02 from the ladder resistor circuit LD3 and the reference voltages RF256 and RF257 from the ladder resistor circuit LD4 individually without being affected by noise of the power supply.

In addition, in Example 2 as well, similar to Example 1, the gamma characteristic adjustment circuit DEC selects the z appropriate gamma reference voltages F1 to Fz from the reference voltages RF01, RF02, and RF0 to RF257 in accordance with the gamma correction data in each of the source drivers 12-2 to 12-S, and the gradation voltages X0 to X255 indicating the 256 gradation luminance levels are generated therefrom. Therefore, luminance unevenness caused by a difference in lengths of the connection lines 14 and 15 can be curbed.

In the foregoing Examples 1 and 2, both the ladder resistor circuits LD3 and LD4 are provided, but the gradation voltage generation circuit 130 including only one of the ladder resistor circuits LD3 and LD4 may be adopted. For example, when the level of each of the reference voltages RF0 to RF255 is reduced due to reduction in level of each of the reference voltages VGH and VGL, only the ladder resistor circuit LD3 may be adopted.

In addition, the foregoing Examples 1 and 2 have described the gradation voltage generation circuit 130 generating 256 gradation voltages X0 to X255, but the disclosure is not limited to generation of 256 gradation voltages.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A source driver that includes a gradation voltage generation circuit generating a plurality of gradation voltages corresponding to respective luminance levels of a luminance range able to be indicated by a video signal based on a plurality of reference voltages having different voltage levels, selects a gradation voltage corresponding to a luminance level indicated by the video signal from the plurality of gradation voltages, and sends out a drive signal having the gradation voltage that is selected to a display panel, wherein the gradation voltage generation circuit has a first input part supplying a first reference voltage at a highest level in the plurality of reference voltages to a first connection point;

a second input part supplying a second reference voltage at a lowest level in the plurality of reference voltages to a second connection point;

a first ladder resistor circuit including a plurality of first resistors connected to each other in series between the first connection point and the second connection point, generating a plurality of first divided voltages by dividing a voltage difference between the first reference voltage and the second reference voltage using the plurality of first resistors, and outputting the plurality of first divided voltages as the first reference voltages of the plurality of reference voltages; and a second ladder resistor circuit including a plurality of second resistors connected to each other in series in at least one of an area between the first connection point and a power supply terminal to which a power supply voltage higher than the first reference voltage is supplied and an area between the second connection point and a grounding terminal to which a ground potential lower than the second reference voltage is supplied, generating at least one second divided voltage by dividing an applied voltage between the plurality of second resistors using the plurality of second resistors, and outputting the at least one second divided voltage as the second reference voltage of the plurality of reference voltages.

2. The source driver according to claim 1, wherein the second ladder resistor circuit has a constant current source connected to the plurality of second resistors in series.

3. The source driver according to claim 1, wherein the gradation voltage generation circuit includes a gamma characteristic adjustment part selecting a predetermined number of reference voltages from the plurality of reference voltages in accordance with gamma correction data, and a third ladder resistor circuit including a plurality of third resistors connected to each other in series and generating the plurality of gradation voltages by dividing a voltage difference between the predetermined number of reference voltages using the plurality of third resistors.

4. The source driver according to claim 3, wherein the first input part has a first input terminal for inputting the first reference voltage, and a voltage follower provided between the first input terminal and the first connection point, wherein the second input part has a second input terminal for inputting the second reference voltage, and a voltage follower provided between the second input terminal and the second connection point, and wherein the gamma characteristic adjustment part has as many voltage followers, inputting the predetermined number of reference voltages and outputting a result thereof to the third ladder resistor circuit, as a number equivalent to the predetermined number.

5. The source driver according to claim 2, wherein the gradation voltage generation circuit includes a gamma characteristic adjustment part selecting a predetermined number of reference voltages from the plurality of reference voltages in accordance with gamma correction data, and a third ladder resistor circuit including a plurality of third resistors connected to each other in series and generating the plurality of gradation voltages by dividing a voltage difference between the predetermined number of reference voltages using the plurality of third resistors.

6. The source driver according to claim 5, wherein the first input part has a first input terminal for inputting the first reference voltage, and a voltage follower provided between the first input terminal and the first connection point, wherein the second input part has a second input terminal for inputting the second reference voltage, and a voltage follower provided between the second input terminal and the second connection point, and wherein the gamma characteristic adjustment part has as many voltage followers, inputting the predetermined number of reference voltages and outputting a result thereof to the third ladder resistor circuit, as a number equivalent to the predetermined number.

7. A display device having a display panel and a source driver that includes a gradation voltage generation circuit generating a plurality of gradation voltages corresponding to respective luminance levels of a luminance range able to be indicated by a video signal based on a plurality of reference voltages having different voltage levels, selects a gradation voltage corresponding to a luminance level indicated by the video signal from the plurality of gradation voltages, and sends out a drive signal having the gradation voltage that is selected to the display panel, wherein the gradation voltage generation circuit has a first input part supplying a first reference voltage at a highest level in the plurality of reference voltages to a first connection point;

a second input part supplying a second reference voltage at a lowest level in the plurality of reference voltages to a second connection point;

a first ladder resistor circuit including a plurality of first resistors connected to each other in series between the first connection point and the second connection point, generating a plurality of first divided voltages by dividing a voltage difference between the first reference voltage and the second reference voltage using the plurality of first resistors, and outputting the plurality of first divided voltages as the first reference voltages of the plurality of reference voltages; and a second ladder resistor circuit including a plurality of second resistors connected to each other in series in at least one of an area between the first connection point and a power supply terminal to which a power supply voltage higher than the first reference voltage is supplied and an area between the second connection point and a grounding terminal to which a ground potential lower than the second reference voltage is supplied, generating at least one second divided voltage by dividing an applied voltage between the plurality of second resistors using the plurality of second resistors, and outputting the at least one second divided voltage as the second reference voltage of the plurality of reference voltages.

* * * * *